(12) United States Patent
Brown

(10) Patent No.: US 8,247,466 B2
(45) Date of Patent: Aug. 21, 2012

(54) VARIABLE FELTED POLYURETHANE FOAMS FOR SPONGES AND WIPES

(75) Inventor: Linda Brown, Media, PA (US)

(73) Assignee: FXI, Inc., Media, PA (US)

(*) Notice: Subject to any disclaimer, the term of this patent is extended or adjusted under 35 U.S.C. 154(b) by 598 days.

(21) Appl. No.: 12/106,447

(22) Filed: Apr. 21, 2008

(65) Prior Publication Data
US 2009/0264549 A1  Oct. 22, 2009

(51) Int. Cl.
*C08G 18/00* (2006.01)

(52) U.S. Cl. .................................. 521/172; 521/155

(58) Field of Classification Search ................... 521/170, 521/172
See application file for complete search history.

(56) References Cited

U.S. PATENT DOCUMENTS

| | | |
|---|---|---|
| 3,125,542 A | 3/1964 | Haines |
| 3,325,338 A | 6/1967 | Green |
| 3,382,090 A | 5/1968 | Meisel |
| 3,405,217 A | 10/1968 | Garrett et al. |
| 3,423,338 A | 1/1969 | Sutton |
| 3,425,890 A | 2/1969 | Powers |
| 3,857,133 A | 12/1974 | Linenfelser |
| 4,051,081 A | 9/1977 | Jabs et al. |
| 4,656,196 A | 4/1987 | Kelly et al. |
| 4,670,477 A | 6/1987 | Kelly et al. |
| 4,769,267 A | 9/1988 | Hoyt |
| 4,776,356 A | 10/1988 | Jou et al. |
| 4,777,186 A | 10/1988 | Stang et al. |
| 4,985,467 A | 1/1991 | Kelly et al. |
| 5,562,876 A * | 10/1996 | Beach et al. ............ 264/321 |
| 5,640,737 A | 6/1997 | Boggs |
| 5,698,601 A | 12/1997 | Welte et al. |
| 6,034,149 A | 3/2000 | Bleys et al. |
| 6,045,741 A * | 4/2000 | Kinoshita et al. ....... 264/321 |
| 6,103,822 A | 8/2000 | Housel et al. |
| 6,391,933 B1 * | 5/2002 | Mattesky ................. 521/114 |
| 6,485,822 B1 | 11/2002 | Osiecki et al. |
| 6,756,416 B2 | 6/2004 | Free et al. |
| 6,841,586 B2 * | 1/2005 | Free et al. .............. 521/172 |
| 6,890,462 B2 * | 5/2005 | Panczyk et al. ......... 264/46.8 |
| 6,994,932 B2 | 2/2006 | Kinkelaar et al. |
| 2002/0163105 A1 * | 11/2002 | Kosaka et al. ......... 264/321 |
| 2006/0008633 A1 | 1/2006 | Chan et al. |

FOREIGN PATENT DOCUMENTS

| | | |
|---|---|---|
| CA | 2168141 | 8/1996 |
| GB | 789481 | 1/1958 |
| GB | 858127 | 1/1961 |
| WO | WO-9902587 A1 | 1/1999 |
| WO | WO-2004013215 A1 | 2/2004 |

* cited by examiner

*Primary Examiner* — Peter F Godenschwager
*Assistant Examiner* — David Karst
(74) *Attorney, Agent, or Firm* — Connolly Bove Lodge & Hutz LLP

(57) ABSTRACT

A polyurethane foam sponge that picks up at least 80% of water in a wipe dry performance test is made by variably felting (compressing under heat and pressure) a foam sheet to a compression ratio of about 1.05 to 2.9. The resulting foam sponge has from 5% to 25% of its top and bottom surface portions modified by the variable felting, while its core portion remains substantially unmodified.

12 Claims, 1 Drawing Sheet

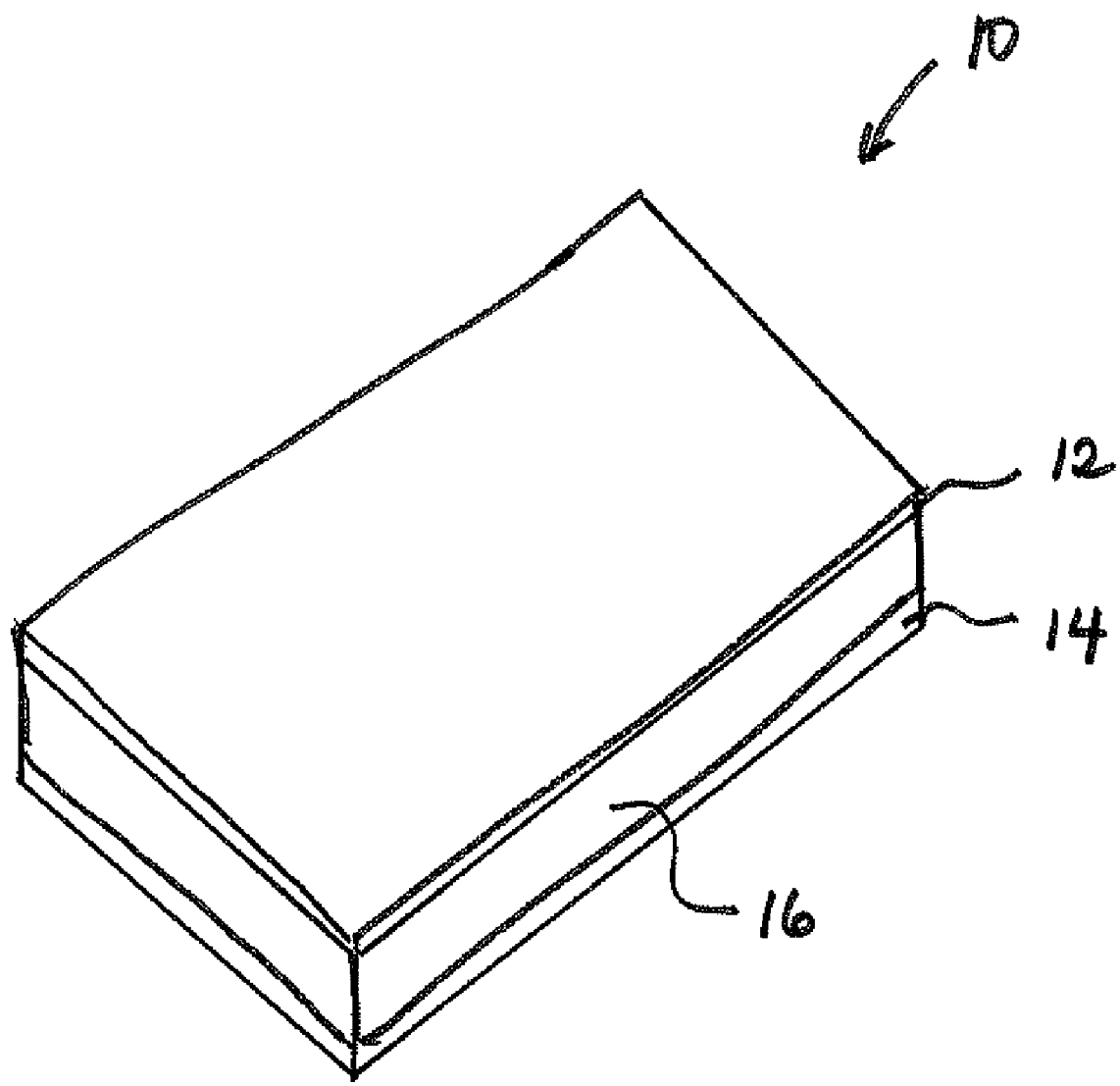

VARIABLE FELTED POLYURETHANE FOAMS FOR SPONGES AND WIPES

This invention relates to polyurethane foams that have been variably felted (partially compressed under heat and pressure) to affect only surface portions of the foams, following which the foams have unexpectedly improved liquid absorption and wicking. The foams may be incorporated into articles used to wipe and absorb liquids, such as household cleaning sponges, wipes and mop heads.

BACKGROUND OF THE INVENTION

Polyurethane foams are generally prepared by the reaction of one or more active hydrogen-containing compounds (i.e., polyols) and one or more polyisocyanates, in the presence of a blowing agent such as water, and usually at least one reaction catalyst and foam stabilizer. The cellular polymer structure of polyurethane foam has a skeletal framework of relatively heavy strands forming an outline for the cell structure. The skeletal framework strands are connected by very thin membranes, often called windows, which form the cell walls. In open-celled foams, some of the windows are open or torn in each cell, thus forming an interconnecting network open to fluid flow (liquid or gas).

Reticulation relates to methods for removing or breaking the cell windows of polyurethane foams. Mechanical, chemical and thermal methods for reticulating foams are known. As one example, foam may be reticulated by melting the windows with a high temperature flame front or explosion, which still leaves the strand network intact. Alternatively, the cell windows may be etched away using the hydrolyzing action of water in the presence of an alkali metal hydroxide. See U.S. Pat. Nos. 3,125,542; 3,405,217; 3,423,338; 3,425,890 and 4,670,477 for descriptions of various reticulating methods for polyurethane foams.

Household cleaning sponges and mop heads most commonly are formed from cellulose. Paper pulp is the primary ingredient for cellulose sponges. The pulp is reacted with carbon disulfide to form a soluble cellulose xanthate compound. This compound is dissolved into a honey-like liquid viscose and mixed with reinforcing fibers to add strength to the pulp mixture. The cellulose is formed with a double cell structure to replicate natural sea sponges. Sodium sulfate crystals are added to the pulps, and this mixture is heated in a mold to melt the crystals. Heating regenerates the mix to pure cellulose and leaves the signature sponge holes where the crystals have melted away. Bleaching chemicals and humectants maintain the moisture level and color purity of the cellulose sponge. While the cellulose has good water absorption and wicking, it has lower wet integrity than other materials. Moreover, upon drying, the cellulose becomes hard and brittle such that it must be pre-wet before using for wiping.

Open celled polyester and polyether polyurethane foams have greater softness and flexibility than cellulose, and retain flexibility upon drying without humectants. As compared to cellulose, polyurethane foams have greater wet strength, better wet integrity and exhibit less swelling when wet. Foams also can be foamed to have a double cell structure to more resemble natural sea sponges. Generally, polyurethane foams can be produced more cheaply than cellulose. However, polyurethane foams are hydrophobic, lacking good liquid absorption and wicking characteristics, which makes them less suitable for household sponges and mop heads. Even after the polyurethane foams are post-treated with surfactants in an attempt to improve water absorption and wicking, they still do not match the performance of cellulose for these properties. Polyurethane sponges tend to leave streaks of water on a wiped surface.

Reticulated polyurethane foams have been used as components of filters. Such foams also have been suggested for use as components of household sponges, particularly for the abrasive surface presented by a reticulated foam. See, e.g., U.S. Pat. Nos. 3,857,133 and 5,640,737.

U.S. Pat. No. 6,756,416 discloses certain hydrophilic ester polyurethane foams that are chemically reticulated to improve water holding capacity and wet strength. Such foams still do not have water absorption and wicking to match that of cellulose under all use conditions.

U.S. Pat. No. 6,841,586 discloses certain hydrophilic ester polyurethane foams that are chemically reticulated to improve water holding capacity and wet strength, and are further felted (compressed under heat and pressure) to improve water absorption rates. The added costs (chemical treatment, energy and fabrication) to produce foams under this teaching to achieve the desired water absorption make such foams prohibitively expensive in comparison to cellulose.

The art still seeks polyurethane foams suitable to replace cellulose materials as liquid absorbing and wicking components of household sponges and mop heads.

SUMMARY OF THE INVENTION

A polyurethane foam sponge that picks up at least 80% of water in a wipe dry performance test is made by variably felting (compressing under heat and pressure) a foam sheet to a compression ratio of about 1.05 to 2.9. The resulting foam sponge has from about 5% to 25% of its top and bottom surface portions modified by the variable felting, while its core portion remains substantially unmodified. Preferably, the foam-forming composition includes one or more hydrophilic polyester polyols.

DESCRIPTION OF THE DRAWINGS

The FIGURE shows a perspective view of a foam sheet that has been variably felted according to the invention.

DESCRIPTION OF THE PREFERRED EMBODIMENTS

Hydrophilic ester foams are prepared preferably by mixing together the polyol component with the surfactants, catalysts, blowing agents and other additives, forming a polyol pre-mix. To the polyol pre-mix is added the isocyanate component. The foam mixture is then allowed to rise and cure, preferably under atmospheric conditions, to form the hydrophilic ester polyurethane foam. The foam-forming process may be carried out batch-wise, semi-continuously or continuously.

Polyester polyurethane foams are more hydrophilic than polyether polyurethane foams due to the increased polarity of the carboxylic acid groups. Suitable polyester polyols for producing flexible polyester polyurethane foams are well known in the industry. Illustrative of such suitable polyester polyols are those produced by reacting a dicarboxylic and/or monocarboxylic acid with an excess of a diol and/or polyhydroxy alcohol, for example, adipic acid, glutaric acid, succinic acid, phthalic acid or anhydride, and/or fatty acids (linolic acid, oleic acid and the like) with diethylene glycol, ethylene glycol, propylene glycol, dipropylene glycol, 1,4-butanediol, neopentyl glycol, trimethylolpropane, trimethylolethane, and/or pentaerythritol. Examples of these polyols are LEXOREZ 1102-50 or LEXOREZ 1102-60 from Inolex Chemical Company or FOMREZ 50 or FOMREZ 60 from Chemtura. Other suitable polyester polyols can be prepared by reacting a lactone with an excess of a diol such as caprolactone with propylene glycol. See U.S. Pat. No. 4,331,555 for further discussion of suitable polyester polyols. Preferably, the polyester polyol is made by reacting adipic acid and ethylene glycol monomers with a glycerin initiator. Some polyester polyols are promoted as hydrophilic polyols to produce polyurethane foam structures with hydrophilic characteristics. These hydrophilic ester polyols are typically reaction products of polyethylene glycol and adipic acid. Examples are FOMREZ 45 from Chemtura and LEXOREZ 1105-HV2 from Inolex Chemical Company. Most preferably, the polyol component of the foam-forming mixture of the invention comprises at least five (5) parts by weight, preferably ten (10), most preferably twenty five (25) parts by weight, of a 50 hydroxyl hydrophilic ester polyol. 60 hydroxyl ester polyols and mixtures of 50 hydroxyl and 60 hydroxyl ester polyols and 50 hydroxyl hydrophilic ester polyols are also preferred.

The "hydroxyl number" ("OH#") for a polyol is a measure of the amount of reactive hydroxyl groups available for reaction. The value is reported as the number of milligrams of potassium hydroxide equivalent to the hydroxyl groups found in one gram of the sample (mg KOH/g). "Functionality" of a polyol is defined as the average number of hydroxyl group sites per molecule. Preferably, when polyester polyols are used to form the foams, the polyols have a hydroxyl number in the range of 20 to 150, more preferably in the range of 40 to 100, and most preferably in the range of 50 to 60.

The term "polyisocyanate" refers particularly to isocyanates that have previously been suggested for use in preparing polyurethane foams. "Polyisocyanates" include di- and polyisocyanates and prepolymers of polyols and polyisocyanates having excess isocyanate groups available to react with additional polyol. The amount of polyisocyanate employed is frequently expressed by the term "index", which refers to the actual amount of isocyanate required for reaction with all of the active hydrogen-containing compounds present in the reaction mixture multiplied by 100. For most foam applications, the isocyanate index is in the range of between about 75 to 140. In this invention, the preferred isocyanate index is in the range of 80 to 110, most preferably 105 or below, with a particularly preferred range of 95 to 101.

The polyester polyurethane foams are prepared using any suitable organic polyisocyanates well known in the art including, for example, hexamethylene diisocyanate, phenylene diisocyanate, toluene diisocyanate (TDI) and 4,4'-diphenylmethane diisocyanate (MDI). The methylene diisocyanates suitable for use are diphenyl methane diisocyanate and polymethylene polyphenyl isocyanate blends (sometimes referred to as "MDI" or "polymeric MDI"). The MDI blends can contain diphenylmethane 4,4'diisocyanate, as well as 2,2' and 2,4' isomers and higher molecular weight oligomers and have an isocyanate functionality of from about 2.1 to 2.7, preferably from about 2.1 to 2.5. Preferably, the isocyanate is selected from a commercial mixture of 2,4- and 2,6-toluene diisocyanate. A well-known commercial toluene diisocyanate is TD80, a blend of 80% 2,4 toluene diisocyanate and 20% 2,6 toluene diisocyanate. Polyisocyanates are typically used at a level of between 20 and 90 parts by weight per 100 parts of polyol, depending upon the polyol OH content and water content of the formulation.

One or more surfactants are also employed in the foam-forming composition. The surfactants lower the bulk surface tension, promote nucleation of bubbles, stabilize the rising cellular structure, emulsify incompatible ingredients, and may have some effect on the hydrophilicity of the resulting foam. The surfactants typically used in polyurethane foam applications are polysiloxane-polyoxyalkylene copolymers, which are generally used at levels between about 0.5 and 3 parts by weight per 100 parts polyol. In the present invention, from 1.0 to 3.0 parts by weight per 100 parts polyol of surfactant is preferred. Surfactants, which may for example be organic or silicone based, such as FOMREZ M66-86A (Chemtura), L532 (GE Silicones) B8301 (Evonik) and 9100 (Altana), may be used to stabilize the cell structure, to act as emulsifiers and to assist in mixing. Most preferably, the surfactant is a cell opening silicone surfactant in an amount from 1.5 to 2.5 parts by weight per 100 parts polyol.

Catalysts are used to control the relative rates of water-polyisocyanate (gas-forming or blowing) and polyol-polyisocyanate (gelling) reactions. The catalyst may be a single component, or in most cases a mixture of two or more compounds. Preferred catalysts for polyurethane foam production are organotin salts and tertiary amines. The amine catalysts are known to have a greater effect on the water-polyisocyanate reaction, whereas the organotin catalysts are known to have a greater effect on the polyol-polyisocyanate reaction. Total catalyst levels generally vary from 0 to 5.0 parts by weight per 100 parts polyol. The amount of catalyst used depends upon the formulation employed and the type of catalyst, as known to those skilled in the art. Although various catalysts may be used in the present invention, we have found that the following ranges of catalyst amounts are satisfactory: amine catalyst from 0.5 to 2.0 parts, per 100 parts polyol; and organotin catalyst from 0 to 0.7 parts, preferably from 0 to 0.3 parts, per 100 parts polyol.

Suitable urethane catalysts useful in the present invention are all those well known to the worker skilled in the art, including tertiary amines such as triethylenediamine, N-methylimidazole, 1,2-dimethylimidazole, N-methylmorpholine, N-ethylmorpholine, triethylamine, tributylamine, triethanolamine, dimethylethanolamine and bisdimethylaminodiethylether, and organotins such as stannous octoate, stannous acetate, stannous oleate, stannous laurate, dibutyltin dilaurate, and other such tin salts.

A double-cell structure may be created to replicate the appearance of natural sea sponges. Materials used to create a double cell structure may be added to the foam forming mixture. These include: castor oil derivatives, stearic acid, acetic acid and low melting point waxes. These materials create voids larger than the prevailing pores within the resulting foam structure. If used, the double-cell additive preferably is added in an amount from 0.04 to 0.21 parts per 100 parts polyol.

A blowing agent may be included in the foam-forming composition. The most typical blowing agent is water that may be added in amounts from 1.5 to 5.0 parts per 100 parts polyol. Alternative blowing agents are liquid carbon dioxide, volatile organic compounds, such as pentane and acetone, and chlorinated compounds, such as methylene chloride, HFC's, HCFC's and CFC's.

Optionally, other additives may be incorporated into the foam-forming composition. The optional additives include, but are not limited to, antimicrobial compounds, stabilizers, extenders, dyes, pigments, crosslinking additives, fragrances, detergents and anti-static agents. Such additives should not have a detrimental effect on the properties of the final polyurethane foam. For sponge and mop head applications, preferably an antimicrobial compound is added in an amount from 0.5 to 1.5 parts per 100 parts polyol. Antimicrobial compounds include, without limitation, tin based compounds such as tributyl tin maleate, isothiazolines, imidazoles, and zinc pyrithione.

The polyurethane foams have cell sizes preferably ranging from 70 to 130 pores per linear inch (27.6 to 51 pores per cm), most preferably 70 to 90 pores per linear inch (27.6 to 35.4 pores per cm), but may also have a double cell or sea sponge-like structure. The preferred double cell structure has a distribution of larger and medium sized cells scattered across a background of finer cells. The larger cells may range from 0.06 to 0.09 inches (1.5 to 2.3 mm) in diameter.

If a polyester polyurethane foam has been made, such foam optionally may be chemically reticulated to remove cell windows by immersing a foam slab in a heated caustic bath for from three to fifteen minutes, preferably from six to ten minutes. One possible caustic bath is a sodium hydroxide solution (from 5.0 to 10.0 percent, preferably 7.5% NaOH) that is heated to from 70° F. to 160° F. (21 to 71° C.), preferably from 120° F. to 160° F. (49 to 71° C.). The caustic solution etches away at least a portion of the cell windows within the foam cellular structure, leaving behind a hydrophilic ester polyurethane foam. The treated polyester foam is compressed between calendaring rolls, and then rinsed thoroughly and oven dried.

Felting refers to a post process where a polyurethane foam is permanently compressed by placing a sheet between two heated platens and compressing the foam until the compression is permanent. The felted foam will have increased capillarity, which will allow the foam to wick water better than an unfelted foam of identical foam composition. The compression ratio is calculated as the pre-felting thickness over the post-felting thickness. The compression ratio is generally referred to as a firmness. For example, a foam compressed to one-third of its original thickness is a firmness 3 felt and has a compression ratio of 3. A foam compressed to one-fifth of its original thickness is a firmness 5 felt.

If the degree of compression is high enough, the felted polyurethane foam can match the wipe dry performance of cellulose. For example, U.S. Pat. No. 6,841,586 is teaches a preferred compression ratio of 3 to 8. The disadvantage is that the high compression ratio necessary to achieve the desired wipe dry performance makes the product prohibitively expensive for its intended use in household sponge applications. Felting foams at lower compression ratios may be less expensive in view of shorter compression times and lower energy use. But if the compression ratio is too low, the foam will not form the felted structure throughout and will not be able to wick water sufficiently enough to obtain the desired wipe dry performance.

In the present invention, it was surprising to discover, however, that a very low compression ratio that did not produce a felted structure throughout the thickness of the foam sheet nevertheless resulted in improved wipe dry performance. To create the structure with the desired wipe dry performance, a foam is variably felted by (a) compressing the foam to a compression ratio between about 1.05 and 2.9, more preferably between about 1.05 to 1.3, and (b) heating the compressed foam at a temperature of from about 340 to 450° F. (171 to 232° C.), more preferably from about 340 to 380° F. (171 to 193° C.), for from about 1 to about 30 minutes, more preferably from about 10 to 22 minutes. This felting method is a non-continuous process. The surface compression can also be achieved in a continuous method by feeding long sheets of foam through heated rollers set to a pre-determined gap to control the degree of compression. It is also possible to thermo-form the foam in a closed heated mold to cause the surface and edge portions to develop a felted structure.

We have found that variably felting to cause about 5% to about 25% of each of the top and bottom surfaces of a foam slab to be compressed achieves desired wipe dry or water absorption performance. As one non-limiting example, a slab of foam is cut to a thickness of ¾ inch. The slab is variably felted to compress its thickness to ⅝ inch (compressed about ⅛ inch). The compression ratio is 0.75/0.625=1.2. Of the resulting ⅝-inch thick slab, from about 0.3 to 0.6 inch of the center or core portion is not felted. As a second non-limiting example, a slab of foam is cut to a thickness of 2 and ⅛ inches. The slab is variably felted to compress its thickness to 2 inches. The compression ratio is 2.125/2.0=1.063. Of the 2-inch thick slab, from about 1 to 1.8 inches of the center or core portion is not felted.

The term "variable felting" is used herein to describe the felting conditions and resulting end product obtained. Due to the very low compression ratio and shortened heating time, the foam structure is not felted through its complete thickness. Rather, surface portions at the top and bottom surfaces (and optionally the side surfaces) of the variably felted slab are modified to a "felt" compressed structure, but the interior portion of such slab is not modified. This incomplete or "variable felting" unexpectedly improves water absorption and water wicking characteristics of the foam.

Referring to the FIGURE, a variably felted slab 10 has compressed or felted top and bottom surfaces 12, 14 with a central or core region 16 in which the foam structure has not been felted.

We have found it advantageous when variably felting polyurethane foam to apply the surface compression in a direction parallel to the foam's rise direction. Since the cells of a foam tend to be elongated along the axis of the foam rise direction, if the felting compression was applied perpendicular to the rise direction, the elongated cells tended to lack sufficient capillarity to absorb water quickly enough to achieve desired wipe dry performance for use as sponges. Particularly favorable results are obtained when the polyurethane foam has a double cell structure and the variable felting is carried out in a direction parallel to the foam's rise direction.

The invention is further illustrated, but not limited, by the following examples.

EXAMPLES

Cellulose sponges were obtained. The cellulose sponge of Example C1 was from 3M.

Polyurethane foams were prepared on a production foam machine by mixing together the foam-forming ingredients and pouring them into a moving conveyor to form foam buns under atmospheric pressure (e.g., 1 atm.) and temperature (about 75° F. (24° C.)). The foam ingredients were mixed according to the proportions shown in Table 1. Amounts are in kilograms and are based on parts by weight per hundred parts polyol. The foams of Examples C2, C3 and C4 are comparison foams not prepared according to the invention. The foams of Examples 1, 2 and 3 were prepared with formulations according to the invention.

Examples C2 and C3 were ester polyurethane foams using standard polyester polyols. The foam of Example C4 was an ester polyurethane foam prepared with a hydrophilic polyol. Examples 1, 2 and 3 were prepared with a hydrophilic polyol.

TABLE 1

Formulations

|  | C1 | C2 | C3 | C4 | 1 | 2 | 3 |
|---|---|---|---|---|---|---|---|
| 1102-50A | Cellulose | 100.0 | 100.0 | 75.0 | 75.0 | 75.0 | 75.0 |
| F45 |  | 0 | 0 | 25.0 | 25.0 | 25.0 | 25.0 |
| B8301 |  | 0 | 0 | 2.0 | 2.0 | 2.0 | 2.0 |
| Y6353 |  | 0.7 | 0.7 | 0 | 0 | 0 | 0 |
| B325 |  | 1.6 | 1.6 | 0 | 0 | 0 | 0 |
| F1058 |  | 1.0 | 1.0 | 0 | 0 | 0 | 0 |
| Water |  | 3.7 | 3.7 | 3.4 | 3.4 | 3.4 | 3.4 |
| DC additive |  | 0 | 0 | 0.46 | 0.46 | 0.46 | 0.46 |
| NEM |  | 0.4 | 0.4 | 0 | 0 | 0 | 0 |
| DM70 |  | 1.4 | 1.4 | 1.0 | 1.0 | 1.0 | 1.0 |
| PC12 |  | 0.12 | 0.12 | 0 | 0 | 0 | 0 |
| K29 |  | 0 | 0 | 0.07 | 0.07 | 0.07 | 0.07 |
| TD80 |  | 47.4 | 47.4 | 34.6 | 34.6 | 34.6 | 34.6 |
| TD65 |  |  |  | 8.6 | 8.6 | 8.6 | 8.6 |
| Index |  | 108 | 108 | 101 | 101 | 101 | 101 |
| Density (lbs/ft$^3$) |  | 1.8 | 1.8 | 1.9 | 1.9 | 1.9 | 1.9 |
| Pore size ppi) |  | 90 | 90 | 70 | 70 | 70 | 70 |
| Background Cell size (in.) |  | None | None | 0.035-0.088 | 0.035-0.085 | 0.035-0.085 | 0.035-0.085 |
| Large holes |  |  |  |  |  |  |  |
| Compression Ratio | Unfelted | Unfelted | 1.3 | Unfelted | 1.1 | 1.2 | 1.3 |

LEXOREZ 1102-50A is an ester polyol with a hydroxyl number of 50 supplied by Inolex Chemical Company. F45 is FOMREZ 45, a 50 hydroxyl hydrophilic ester polyol offered by Chemtura. TEGOSTAB B8301 is a cell opening silicone surfactant from Evonik Industries. NIAX Silicone Y6353 is a silicone surfactant from GE Silicones. The double cell additive ("DC additive") is a castor oil derivative from Rebus used to provide an optional sea sponge like structure to the foam. KOSMOS K29 is a stannous octoate catalyst (tin catalyst) from Evonik Industries. NEM is an amine catalyst, n-ethyl morpholine. TD80 is a toluene diisocyanate mixture comprised of 80 percent 2,4-toluene diisocyanate and 20 percent 2,6-toluene diisocyanate. TD65 is a toluene diisocyanate mixture comprised of 65 percent 2,4-toluene diisocyanate and 35 percent 2,6-toluene diisocyanate. The "index" is the isocyanate index. The cellular structure of the foam can be uniform or have a distribution of different cell sizes. The uniform cell structure is described by the number of pores per linear inch. The number is derived from a visual comparison of the foam to a standard. Double-cell foams have cells of varying sizes. The pores of the larger cells are within the stated range.

The wipe dry performance of each foam sponge was evaluated in the following manner. The test material was cut into a rectangular sponge (11.2 cm by 7.7 cm by 1.5 cm), the size of a typical cellulose kitchen sponge. The sponge's initial dry weight was recorded. The sponge was then immersed in water and squeezed so the sponge contained its weight in water. The sponge was then placed in a 8.0 cm wide, 10-inch long channel and covered with a 1215 gram weight to simulate a 0.2 psi force on the foam. This amount of force approximates the amount of pressure applied by a household user during wiping. Thirty grams of water were poured 1.5 inches in front of the leading edge of the sponge. The sponge was then pushed down the ten inch long channel in 4 seconds. The weight was removed from the sponge and the sponge was re-weighed to determine the amount of water absorbed. The wiped surface was also observed to note how dry the surface appeared.

TABLE 2

Test Results

| Sample | C1 Cellulose | C2 Unfelted | C3 Felted | C4 Unfelted | 1 Felted | 2 Felted | 3 Felted |
|---|---|---|---|---|---|---|---|
| Grams Water Absorbed |  |  |  |  |  |  |  |
| Trial 1 | 28.45 | 14.80 | 9.97 | 18.22 | 26.33 | 25.87 | 29.65 |
| Trial 2 | 28.07 | 10.78 | 10.73 | 12.71 | 27.94 | 30.75 | 29.45 |
| Trial 3 | 28.64 | 11.90 | 7.62 | 18.87 | 28.54 | 29.67 | 29.51 |
| Average | 28.39 | 12.49 | 9.44 | 16.60 | 27.60 | 28.76 | 29.54 |

Referring to the data presented in Table 2, the foams felted according to the invention performed comparably to the cellulose sponge (Example C1) in the wipe dry test. The inventive foams in examples 1, 2 and 3 are double cell polyester polyurethane foams made with a blend of a hydrophilic ester polyol and a conventional ester polyol. These foams exhibited an unexpected increase in water pickup when the foam was compressed only slightly (compression ratio of 1.1 to 1.3). The lightly compressed foams absorbed more than 80% of the water. Example 1 absorbed about 92% of the water, yet the same base foam in the unfelted configuration absorbed only about 55% of the water. Example 3 absorbed close to 99% of the water. This increase in water absorption was unexpected with just the slight amount of compression.

Comparative examples C2 and C3 demonstrate that, in combination with the variable felting processing, some hydrophilicity imparted by polyol selection may be needed to achieve wipe dry performance comparable to cellulose. The foams in C2 and C3 were made with conventional ester polyol and without a hydrophilic polyol. These foams absorbed less water (only 31.5% and 41.6%) in the felted and unfelted configurations.

Felting the foams according to the invention achieved surprisingly improved wipe dry performance. The differentially felted foams left a wet surface surprisingly dry without the requirement of a high felting firmness or a chemical post process (such as reticulation) to make the foam more hydrophilic.

The invention has been illustrated by detailed description and examples of the preferred embodiments. Various changes in form and detail will be within the skill of persons skilled in the art. Therefore, the invention must be measured by the claims and not by the description of the examples or the preferred embodiments.

I claim:

1. A method for making a hydrophilic polyurethane foam, comprising:
    variably felting a sheet of polyurethane foam having a top surface and a bottom surface by compressing the foam in a direction parallel to its foam rise direction at a compression ratio of about 1.05 to 1.2 and at a temperature in the range of about 340 to about 450° F. (171 to 232° C.) for about 10 to about 22 minutes so as to cause from the top surface to a depth of from about 5% to about 25% of the thickness and from the bottom surface to a depth of from about 5% to about 25% of the thickness to have a felted structure,
    wherein the felted polyurethane foam absorbs water.

2. The method of claim 1, wherein the sheet of polyurethane foam is variably felted at a temperature in the range of about 340 to about 380° F. (171 to 193° C.).

3. The method of claim 1, wherein the variably felting is carried out to cause solely from 5% to 25% of the top surface and solely from 5% to 25% of the bottom surface to have a felted structure.

4. The method of claim 1, wherein the as felted polyurethane foam has wipe dry water pick up of at least about 80% of water in a wipe dry performance test exposing an 11.2 cm by 7.7 cm by 1.5 cm sponge of the felted polyurethane foam to 30 g of water for 4 seconds.

5. The method of claim 1, further comprising reticulating the polyurethane foam prior to variably felting.

6. The method of claim 1, wherein the polyurethane foam is formed with a polyol selected from the group consisting of one or more polyester polyols, one or more hydrophilic polyester polyols, and mixtures thereof.

7. The method of claim 1, wherein the polyurethane foam is formed from a foam composition that incorporates one or more double cell additives.

8. The method of claim 1, wherein the polyurethane foam is formed from a foam composition that incorporates one or more wetting agents.

9. The method of claim 1, wherein before felting, the polyurethane foam has pore sizes in the range of 70 to 130 pores per linear inch (27.6 to 51 pores per cm).

10. A hydrophilic polyurethane foam made according to the method of claim 1.

11. A sponge, mop, or industrial wipe, comprising the hydrophilic foam of claim 10.

12. An absorbent article or absorbent component, comprising:
    a single hydrophilic polyurethane foam sheet of one foam composition, said sheet having a top surface, a bottom surface and a thickness between the top surface and the bottom surface, wherein foam from the top surface to a depth of only from about 5% to about 25% of the thickness is felted, and wherein foam from the bottom surface to a depth of only from about 5% to about 25% of the thickness is felted, wherein remaining foam between the top surface and the bottom surface of from about 50% to about 90% of the thickness remains unfelted, and wherein said sheet is made by the method of claim 1.

* * * * *